United States Patent
Purcell et al.

(10) Patent No.: US 12,525,254 B2
(45) Date of Patent: Jan. 13, 2026

(54) BONDING MODULE AND CABLE DESIGN FOR MAGNETIC TAPE HEADS

(71) Applicant: INTERNATIONAL BUSINESS MACHINES CORPORATION, Armonk, NY (US)

(72) Inventors: Brandon Purcell, San Jose, CA (US); Ho-Yiu Lam, Mountain View, CA (US); Aren Yeghissian-Kanneian, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 18/668,679

(22) Filed: May 20, 2024

(65) Prior Publication Data

US 2025/0356877 A1    Nov. 20, 2025

(51) Int. Cl.
*G11B 5/187* (2006.01)
*G11B 5/127* (2006.01)

(52) U.S. Cl.
CPC .......... *G11B 5/187* (2013.01); *G11B 5/1272* (2013.01)

(58) Field of Classification Search
None
See application file for complete search history.

(56) References Cited

U.S. PATENT DOCUMENTS

| | | | |
|---|---|---|---|
| 6,781,792 B2 | 8/2004 | Biskeborn | |
| 7,760,465 B2 | 7/2010 | Koeppe | |
| 8,159,053 B2 | 4/2012 | Andrews, Jr. | |
| 8,164,858 B1* | 4/2012 | Moravec | G11B 5/4853 360/234.5 |
| 8,264,793 B2* | 9/2012 | Biskeborn | G11B 5/584 360/122 |
| 8,675,310 B2 | 3/2014 | Biskeborn | |
| 9,036,297 B2 | 5/2015 | Biskeborn | |
| 9,406,318 B2* | 8/2016 | Sasaki | G11B 5/3116 |
| 9,721,601 B2 | 8/2017 | Biskeborn | |
| 9,767,833 B1* | 9/2017 | Brown | G11B 21/16 |
| 10,026,666 B2 | 7/2018 | Juneja | |
| 10,199,057 B1* | 2/2019 | Seagle | G11B 5/00826 |
| 10,796,718 B2 | 10/2020 | Biskeborn | |
| 10,832,706 B2 | 11/2020 | Biskeborn | |
| 10,902,867 B1* | 1/2021 | Biskeborn | G11B 5/00813 |
| 2002/0184754 A1* | 12/2002 | Yang | H01L 23/49531 361/813 |

(Continued)

OTHER PUBLICATIONS

"Silicon-to-silicon system optimization signal integrity design guide 2016," SAMTEC, 2016, 34 pp.

(Continued)

*Primary Examiner* — Steven Lim
*Assistant Examiner* — Michelle J. Kim
(74) *Attorney, Agent, or Firm* — KONRAD, RAYNES, DAVDA & VICTOR LLP; Alan S. Raynes

(57) ABSTRACT

Provided are devices and methods relating to a magnetic tape head module, including an apparatus comprising a magnetic tape head module including a module bonding pad region including a first row of module bonding pads and a second row of module bonding pads, the first row of module bonding pads and the second row of module bonding pads configured to accommodate wirebonds thereon.

20 Claims, 4 Drawing Sheets

(56) References Cited

U.S. PATENT DOCUMENTS

| | | | | |
|---|---|---|---|---|
| 2007/0215744 A1* | 9/2007 | Sogabe | ............... | B29C 66/1222 |
| | | | | 242/608.8 |
| 2014/0118860 A1* | 5/2014 | Poorman | ............ | G11B 5/00826 |
| | | | | 360/110 |
| 2015/0200187 A1* | 7/2015 | Park | ........................ | H01L 24/49 |
| | | | | 257/777 |
| 2023/0081254 A1* | 3/2023 | Liang | ................... | G11B 5/4893 |
| | | | | 33/700 |

OTHER PUBLICATIONS

Robert Hult (May 2020). Over-the-Board Technologies Raise High-Speed Signals to New Levels. Connector Supplier, 2020. R.Hult, "Over-the-Board Technologies Raise High-Speed Signals to New Levels," Connector Supplier, May 12, 2020, 9 pp.

\* cited by examiner

BONDING MODULE AND CABLE DESIGN FOR MAGNETIC TAPE HEADS

BACKGROUND OF THE INVENTION

1. Field of the Invention

Provided are devices and methods related to magnetic tape head modules.

2. Description of the Related Art

In magnetic storage systems, data is read from and written onto magnetic recording media utilizing magnetic read transducer elements (known as readers) and write transducer elements (known as writers) formed on a head. Data is written on the magnetic recording media such as a tape by moving a writer to a position over the media where the data is to be stored. The magnetic recording transducer (a writer) generates a magnetic field, which encodes the data into the magnetic media. Data is read from the media by similarly positioning the reader and sensing the magnetic field of the magnetic media. Read and write operations may be independently synchronized with the movement of the media to ensure that the data can be read from and written to the desired location on the media.

The magnetic transducer elements for more than one tape head may be formed on a wafer substrate. Arrays of magnetic transducer elements may be formed in rows on the wafer substrate, which is cut to separate the rows of transducer arrays into chiplets, which may each include one or more arrays of transducers (readers and/or writers). A magnetic tape head may be formed by securing a chiplet on a supporting member (also known as a base) such as a U-beam which gives the tape head structural integrity. The chiplet coupled to the base constitutes a module, and a tape head may include one or more modules. Signals may be transferred to and from the module through a cable.

SUMMARY

Provided is an apparatus comprising a magnetic tape head module including a module bonding pad region including a first row of module bonding pads and a second row of module bonding pads, the first row of module bonding pads and the second row of module bonding pads configured to accommodate wirebonds thereon.

Also provided is an apparatus comprising a magnetic tape head module including a first row of module bonding pads and a second row of module bonding pads, and a cable including a first row of cable bonding pads and a second row of cable bonding pads. The magnetic tape head module and the cable are positioned so that the that the first row of module bonding pads and the first row of the cable bonding pads are positioned between the second row of module bonding pads and the second row of cable bonding pads. The apparatus also includes a first group of wirebonds electrically coupling the first row of module bonding pads and the first row of cable bonding pads, and a second group of wirebonds electrically coupling the second row of module bonding pads to the second row of cable bonding pads. In addition, the second group of wirebonds is positioned to extend over the first group of wirebonds.

Also provided is a method for forming an apparatus comprising providing a tape head module including a first row of module bonding pads and a second row of module bonding pads. The method includes providing a cable including a first row of cable bonding pads and a second row of cable bonding pads. The method also includes providing at least one of the module bonding pad region and the cable bonding pad region with a stepped structure configuration so that the at least one of the module bonding pad region and the cable bonding pad region has the first row at a different height than the second row. In addition, the method provides a first group of wirebonds coupling a plurality of the bonding pads in the first row of module bonding pads to a plurality of the bonding pads in the first row of cable bonding pads, and a second group of wirebonds coupling a plurality of the bonding pads in the second row of module bonding pads to a plurality of the bonding pads in the second row of cable bonding pads.

DETAILED DESCRIPTION

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Certain embodiments include an apparatus including a magnetic tape head module configured with a plurality of rows of bonding pads for coupling the module to a cable. The use of a plurality of rows of bonding pads leads to advantages including the ability to provide a greater density of electrical connections and thus more channels on the module without significant changes to the module geometry and dimensions, when compared to conventional modules utilizing a single row of bonding pads.

Certain embodiments also include the use of a cable comprising multiple rows of bonding pads for making electrical connections to the magnetic tape head using wirebonds. To avoid interference between the rows of wirebonds, in various embodiments the bonding pads rows on one or both of the tape head module and cable may be positioned at different heights so that the wirebonds in a first row are adequately spaced apart from those in a second row.

Figure 1:
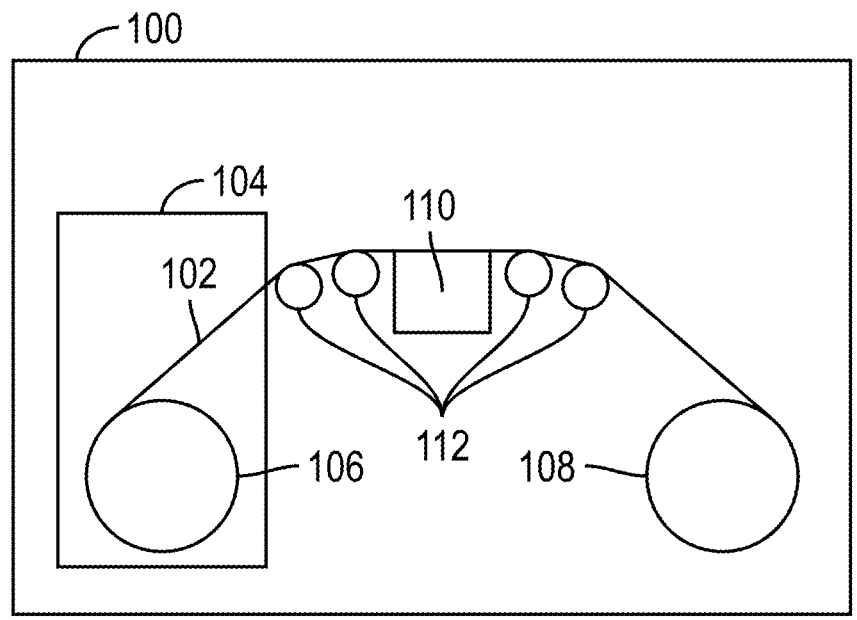
FIG. 1 illustrates a tape drive device in which embodiments are implemented.

FIG. 1 illustrates an embodiment of a tape drive 100 to read and write with respect to a magnetic tape 102 of a magnetic tape cartridge 104. The magnetic tape cartridge 104 comprises a length of magnetic tape 102 wound on one or two reels 106, 108. By way of example, the magnetic tape cartridge 104 may comprise a single reel tape, such as adhering to the Linear Tape Open (LTO) format. An example of a tape drive 100 is the International Business Machines Corporation TS1160 Tape Drive. Various implementations of the tape cartridge 104 and tape drive 100 may also be used, such as LTO type tape drives.

The tape drive 100 may further include one or more controllers (not shown) to operate the tape drive 100 in accordance with commands received from a host system. The tape drive 100 may comprise a standalone unit or comprise a part of a tape library or other subsystem. The tape drive 100 may be coupled to a host system directly, through a library, or over a network.

The tape cartridge 104 may be inserted in the tape drive 100 and loaded by the tape drive 100 mechanisms so that one or more read and/or write elements on a tape head 110 reads and/or writes information in the form of signals with respect to the magnetic tape 102 as the tape is moved by one or more motors (not shown) which rotate the reels 106, 108. The magnetic tape 102 typically comprises a plurality of parallel tracks, or groups of tracks. In some formats, such as the LTO format, above, the tracks are arranged in a serpentine back and forth pattern of separate wraps, as is known to those of skill in the art. Tape guide rollers 112 guide the tape 102 across the tape head 110 to stabilize the positioning of the tape 102 with respect to the tape head 110 to reduce position error signals (PES). The tape head 110 may include one or more tape head modules that include read and/or write elements.

Figure 2:
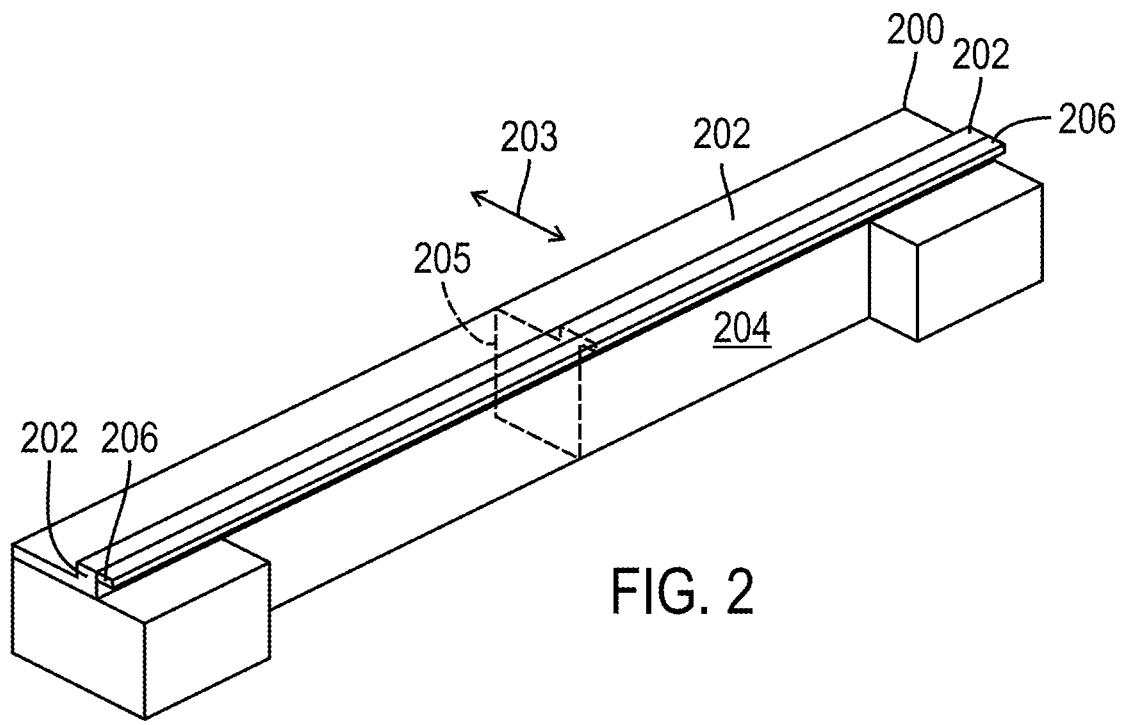
FIG. 2 illustrates a tape head module in accordance with certain embodiments.

FIG. 2 illustrates a perspective view of a tape head module 200 in accordance with certain embodiments for use in a magnetic tape head such as the tape head 110 illustrated in FIG. 1. The magnetic tape head module 200 includes a chiplet 202 mounted on a U-beam support 204 through which wiring may be attached to the chiplet 202. The chiplet 202 comprises a wafer portion or substrate that includes a base layer and multiple thin film layers for forming devices and other structures in the active region, including read and/or write elements. The base layer may be formed from any suitable material including, but not limited to, a hard material such as AlTiC, which is a ceramic composite material including insulative aluminum oxide ($Al_2O_3$) plus conductive titanium carbide (TiC). As illustrated in FIG. 2, a closure 206 may be attached at an end of the chiplet 202. The closure 206 may be formed from any suitable material including, but not limited to, a hard material such as that used for the base layer. The closure 206 may be formed as a separate part that is coupled to the layers formed on the substrate using any suitable mechanism including, but not limited to, an adhesive. The tape (not shown in FIG. 2) may travel over the upper surface (air bearing surface) shown in FIG. 2 in the directions indicated by arrow 203.

Figure 3:
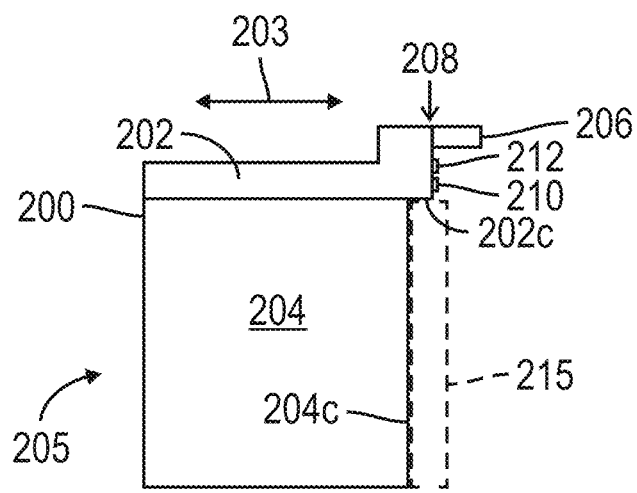
FIG. 3 illustrates a cross-sectional view of a tape head module in accordance with certain embodiments.

FIG. 3 illustrates a cross-sectional view of the module 200 along the dotted line region 205 in FIG. 2. The chiplet 202 portion of the module 200 includes an active region at the location indicated by arrow 208 where any suitable writers and/or readers may be positioned. In certain embodiments electrical connections to the active region may be made using bonding pads 210, 212 on the chiplet 202. FIG. 3 also illustrates a dotted line 215 outlining a location where a cable may be positioned on the module 200, adjacent to the surface 204c of U-beam support 204 and adjacent to the surface 202c of the chiplet 202, so that electrical connections can be made to the bonding pads 210, 212.

Figure 4:
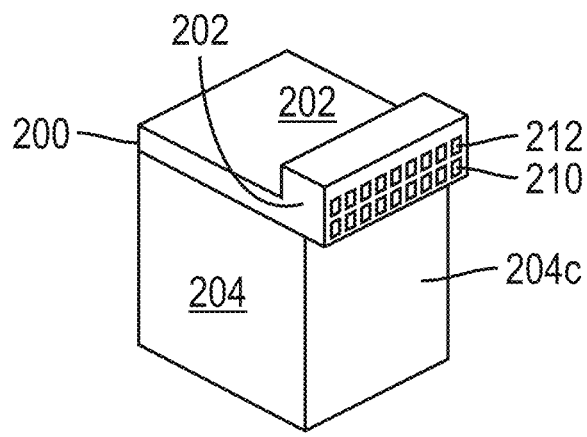
FIG. 4 illustrates a perspective view of a portion of a tape head module in accordance with certain embodiments.

FIG. 4 illustrates a perspective view of a central portion of the module 200 without the closure 206, in accordance with certain embodiments. The module 200 includes first and second rows of bonding pads 210, 212 extending along the module on a side that in certain embodiments is substantially perpendicular to the air bearing surface of the portion of the module 200 shown in FIG. 4. In certain embodiments the bonding pads may extend along part or all of the length of the module. One embodiment that may be suitable for a 128 channel module includes two rows of 150 bonding pads with an 85 micron (µm) pitch, extending about 12.75 mm across the chiplet, which may have an overall length of about 22.5 mm. Various other bonding pads configurations may be utilized in accordance with other embodiments including a different number of bonding pads to support, for example, modules including, but not limited to 32 and 64 channels.

FIGS. 5-8 illustrate portions of a tape head module and cable each including a plurality of rows of bonding pads in accordance with certain embodiments. While a U-beam support such as that illustrated in FIGS. 2-4 may be provided, such U-beam is not shown in FIGS. 5-8. Embodiments may utilize suitable wirebonding techniques such as wedge bonding for forming the wirebonds.

Figure 5:
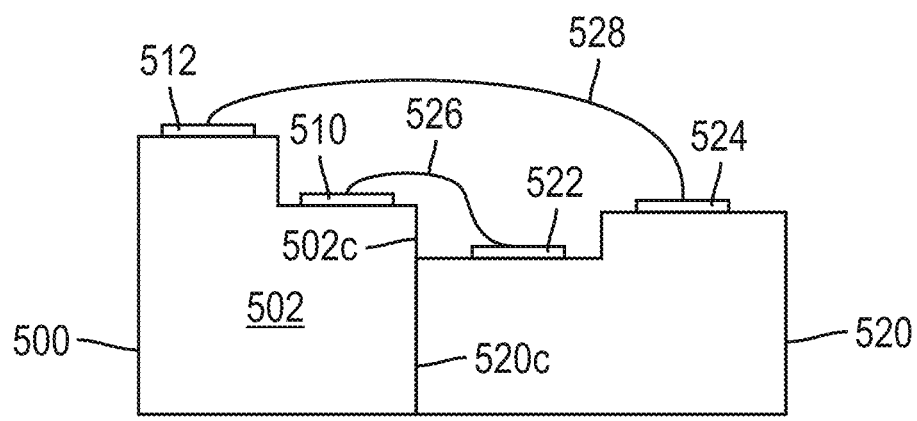
FIG. 5 illustrates a portion of a tape head module and cable in accordance with certain embodiments.

FIG. 5 illustrates an embodiment including a portion of a tape head module 500 adjacent to a portion of a cable 520. The illustrated portion of the module 500 comprises a portion of a chiplet 502 that includes a surface 502c that may be similar to the chiplet surface 202c in FIG. 3. The module 500 includes a bonding pad surface region having a stepped structure configuration with rows at different heights, including a first row of module bonding pads 510 on a first level and a second row of module bonding pads 512 on a second level that extends outward a greater distance than the first level. As illustrated, the second level module bonding pads 512 are at a higher position (height) than the first level module bonding pads 510. The distance between the first row of module bonding pads 510 and the surface 502c is less than the distance between the second row of module bonding pads 512 and the surface 502c.

The cable 520 also includes a region with a stepped structure configuration with rows at different heights, including a first row of cable bonding pads 522 on a first level and a second row of cable bonding pads 524 on a second level that extends outward a greater distance than the first level. The distance between the first row of cable bonding pads 522 and the cable surface 520c is less than the distance between the second row of cable bonding pads 524 and the cable surface 520c. As seen in FIG. 5, the first row of cable bonding pads 522 is positioned at a lower level than the first row of module bonding pads 510. The first row of module bonding pads 510 and the first row of cable bonding pads 522 are positioned between the second row of module bonding pads 512 and the second row of cable bonding pads 524.

Wirebonds 526 are formed between module bonding pads 510 and cable bonding pads 522, and wirebonds 528 are formed between module bonding pads 512 and cable bonding pads 524. As illustrated, the wirebonds 528 are positioned over the wirebonds 526 and as such are fly over wirebonds. The spacing between the various levels provides sufficient space to limit interference between the wirebonds 528 and the wirebonds 526.

Figure 6:
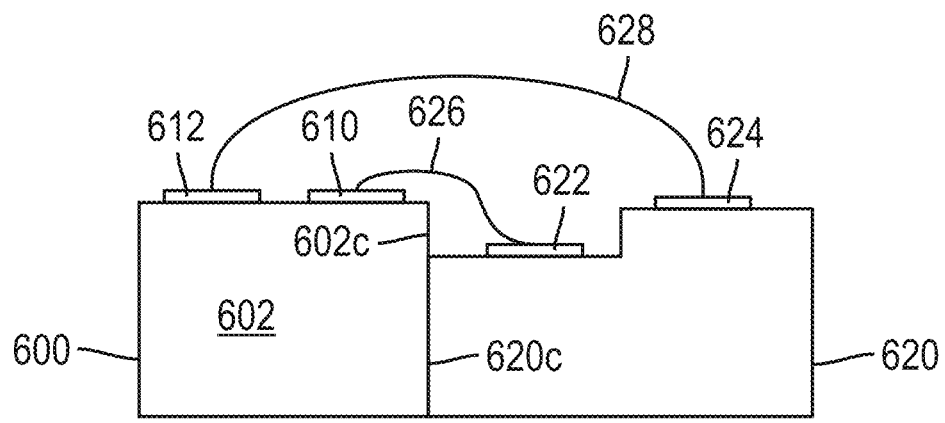
FIG. 6 illustrates a portion of a tape head module and cable in accordance with certain embodiments.

FIG. 6 illustrates an embodiment including a portion of a tape head module 600 adjacent to a portion of a cable 620.

The illustrated portion of the module 600 comprises a portion of a chiplet 602 that includes a surface 602c that may be similar to the chiplet surface 202c in FIG. 3. The module 600 includes a bonding pad region having rows at the same height, including a single level bonding pad structure with a first row of module bonding pads 610 on a common level at a common height with a second row of module bonding pads 612. The distance between the first row of module bonding pads 610 and the surface 602c is less than the distance between the second row of module bonding pads 612 and the surface 602c.

The cable 620 includes a stepped structure configuration with rows at different heights, including a first row of cable bonding pads 622 on a first level and a second row of cable bonding pads 624 on a second level that extends outward a greater distance than the first level. The distance between the first row of cable bonding pads 622 and the cable surface 620c is less than the distance between the second row of cable bonding pads 624 and the cable surface 620c. The first row of module bonding pads 610 and the first row of cable bonding pads 622 are positioned between the second row of module bonding pads 612 and the second row of cable bonding pads 624. As illustrated, the second row of cable bonding pads 624 are at a higher position (height) than the first row of cable bonding pads 622.

As seen in FIG. 6, the first row of cable bonding pads 622 is positioned at a lower level than the first row of module bonding pads 610. Wirebonds 626 are formed between the first row of module bonding pads 610 and the first row of cable bonding pads 622, and fly over wirebonds 628 are formed between the second row of module bonding pads 612 and the second row of cable bonding pads 624. By providing the first row of cable bonding pads 622 at a lower level, the position of the wirebonds 626 formed between the first row of module bonding pads 610 and the first row of cable bonding pads 622 provides sufficient space for the fly over wirebonds 628 to be formed between the second row of module bonding pads 612 and the second row of cable bonding pads 624 while limiting interference between the wirebonds 626 and wirebonds 628.

Figure 7:
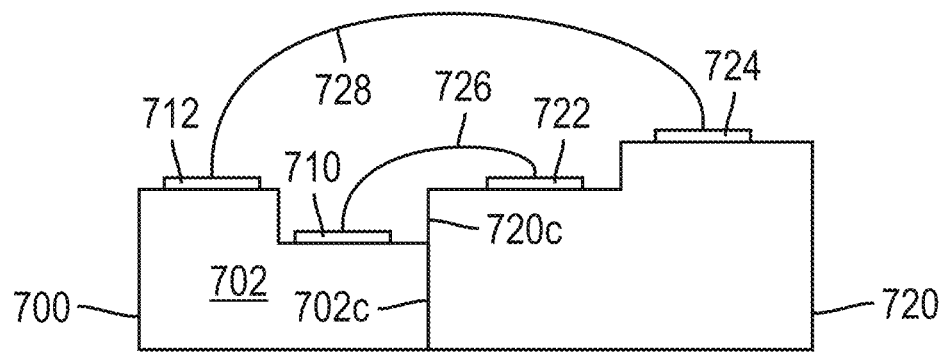
FIG. 7 illustrates a portion of a tape head module and cable in accordance with certain embodiments.

FIG. 7 illustrates an embodiment including a portion of a tape head module 700 adjacent to a portion of a cable 720. The illustrated portion of the module 700 comprises a portion of a chiplet 702 that includes a surface 702c that may be similar to the chiplet surface 202c in FIG. 3. The module 700 includes a bonding pad region having a stepped structure with rows at different heights, including a first row of module bonding pads 710 on a first level and a second row of module bonding pads 712 on a second level that extends outward a greater distance than the first level. As illustrated, the second level module bonding pads 712 are at a higher position (height) than the first level module bonding pads 710. The distance between the first row of module bonding pads 710 and the surface 702c is less than the distance between the second row of module bonding pads 712 and the surface 702c.

The cable 720 also includes a region with a stepped structure configuration with rows at different heights, including a first row of cable bonding pads 722 on a first level and a second row of cable bonding pads 724 on a second level that extends outward a greater distance than the first level. The distance between the first row of cable bonding pads 722 and the cable surface 720c is less than the distance between the second row of cable bonding pads 724 and the cable surface 720c. As seen in FIG. 7, the first row of cable bonding pads 722 is positioned at a higher level than the first row of module bonding pads 710. The first row of module bonding pads 710 and the first row of cable bonding pads 722 are positioned between the second row of module bonding pads 712 and the second row of cable bonding pads 724.

Wirebonds 726 are formed between module bonding pads 710 and cable bonding pads 722, and fly over wirebonds 728 are formed between module bonding pads 712 and cable bonding pads 724. The spacing between the various levels provides sufficient space to limit interference between the wirebonds 728 and the wirebonds 726.

Figure 8:
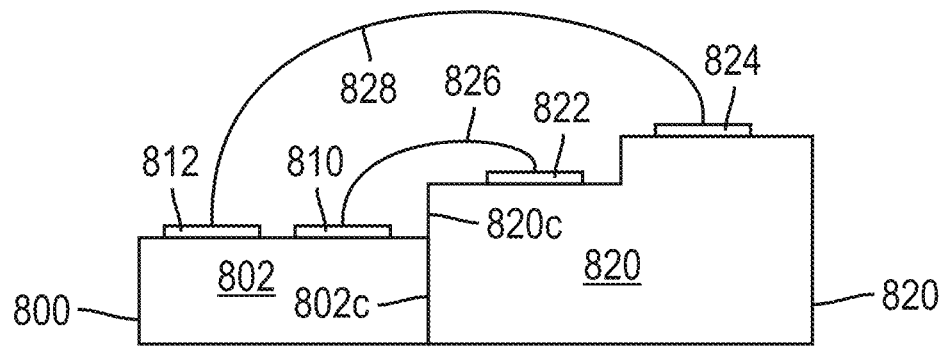
FIG. 8 illustrates a portion of a tape head module and cable in accordance with certain embodiments.

FIG. 8 illustrates an embodiment including a portion of a tape head module 800 adjacent to a portion of a cable 820. The illustrated portion of the module 800 comprises a portion of a chiplet 802 that includes a surface 802c that may be similar to the chiplet surface 202c in FIG. 3. The module 800 includes a bonding pad region having rows at the same height, including a single level bonding pad structure with a first row of module bonding pads 810 on a common level at a common height with a second row of module bonding pads 812. The distance between the first row of module bonding pads 810 and the surface 802c is less than the distance between the second row of module bonding pads 812 and the surface 802c.

The cable 820 includes a stepped structure configuration with rows at different heights, including a first row of cable bonding pads 822 on a first level and a second row of cable bonding pads 824 on a second level that extends outward a greater distance than the first level. The distance between the first row of cable bonding pads 822 and the cable surface 820c is less than the distance between the second row of cable bonding pads 824 and the cable surface 820c. The first row of module bonding pads 810 and the first row of cable bonding pads 822 are positioned between the second row of module bonding pads 812 and the second row of cable bonding pads 824. As illustrated, the second row of cable bonding pads 824 are at a higher position (height) than the first row of cable bonding pads 822.

As seen in FIG. 8, the first row of cable bonding pads 822 is positioned at a higher level than the first row of module bonding pads 810, and the second row of cable bonding pads 824 is positioned at a higher level than the second row of module bonding pads 812. Wirebonds 826 are formed between the first row of module bonding pads 810 and the first row of the cable bonding pads 822, and fly over wirebonds 828 are formed between the second row of module bonding pads 812 and the second row of cable bonding pads 824. Such a configuration allows the position of the wirebonds 826 between the first row of module bonding pads 810 and the first row of cable bonding pads 822 to provide sufficient space for the fly over wirebonds 828 to be formed between the second row of module bonding pads 812 and the second row of cable bonding pads 824 while limiting interference between the wirebonds 826 and wirebonds 828.

Where the bonding pad rows may be provided with a stepped structure having bonding pads at different levels as described above, the spacing between levels may in certain embodiments be up to about 200 μm, with certain embodiments including a more narrow range of spacing from about 20 μm to about 100 μm.

While FIGS. 5-8 illustrate two rows of bonding pads on both the tape head module and the cable, other embodiments may utilize greater than two rows in order to increase the number of electrical connections that can be made. When greater than two rows are used, multiple layers of fly over bonding may be used for the wirebonds.

Figure 9:
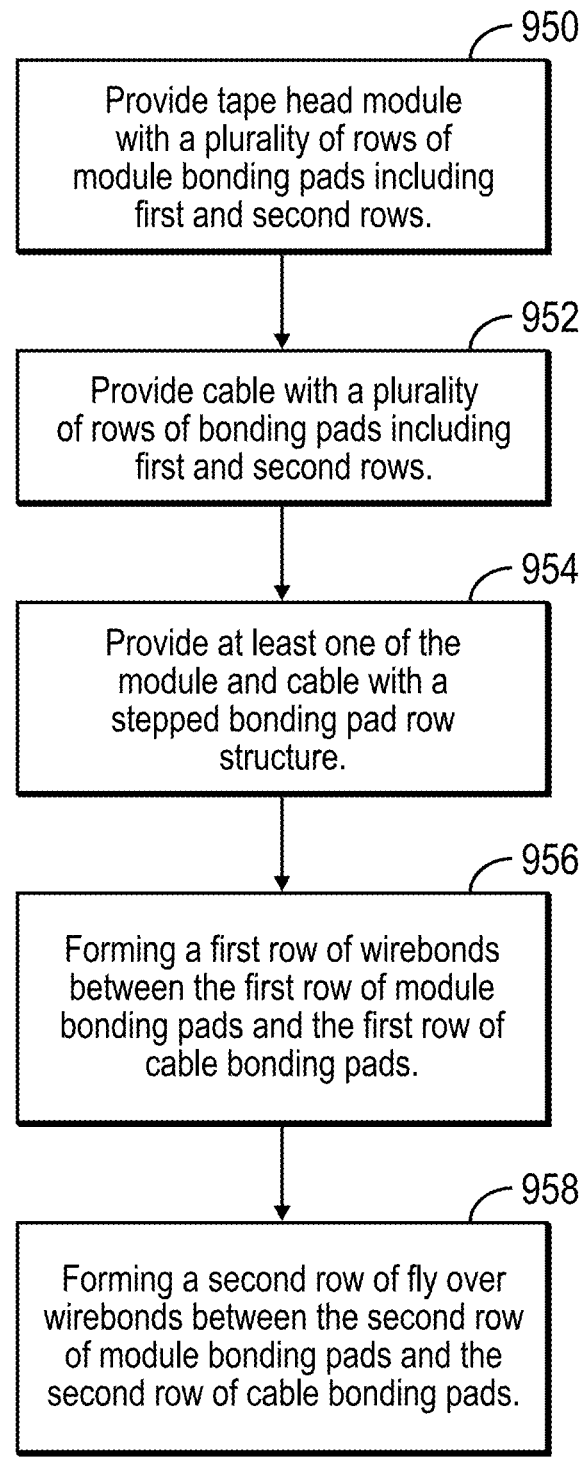
FIG. 9 illustrates a flowchart of operations in accordance with certain embodiments.

Embodiments also relate to methods for forming an apparatus including a tape head module and a cable electrically coupled thereto using fly over wirebonding. FIG. 9 is a flowchart of operations in accordance with certain embodiments. Some of the operations have been discussed above in connection with embodiments illustrated in other figures. Block 950 is providing tape head module comprising a plurality of rows of module bonding pads, including first and second rows of module bonding pads. Block 952 is positioned a cable adjacent to a portion of the tape head module, the cable including a plurality of rows of cable bonding pads including first and second rows of cable bonding pads. Block 954 is providing at least one of the module and the cable with a stepped bonding pad structure configuration so that the first and second rows on the at least one of the module and the cable are at different height levels. Block 956 is forming a first row of wirebonds electrically coupling the first row of module bonding pads and the first row of cable bonding pads. Block 958 is forming a second row of fly over bonding pads electrically coupling the second row of module bonding pads and the second row of cable bonding pads.

It will be appreciated that various other changes and modifications can be made to the particular embodiments described. In general, where features are described herein with reference to a magnetic tape embodying the invention, corresponding features may also be provided in various methods and in various devices such as tape storage devices embodying the invention.

The descriptions of the various embodiments of the present invention have been presented for purposes of illustration but are not intended to be exhaustive or limited to the embodiments disclosed. Systems, devices, and methods relating to reading and writing to magnetic tape may utilize features described above in various embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the described embodiments, any variables i, n, etc., when used with different elements may denote a same or different instance of that element.

Terms such as "an embodiment", "embodiment", "embodiments", "the embodiment", "the embodiments", "one or more embodiments", "some embodiments", "certain embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices/articles. The functionality and/or the features of a device may be alternatively embodied by one or more other devices which are not explicitly described as having such functionality/features. Thus, other embodiments of the present invention need not include the device itself.

Aspects of the present invention are described herein with reference to flowchart illustrations and/or block diagrams according to embodiments of the invention. Individual blocks may be optional, and the order of blocks may be varied. Inventive subject matter may be found in each block individually or in groups of the blocks. It will be understood that each block of the flowchart illustrations and/or block diagrams, and combinations of blocks in the flowchart illustrations and/or block diagrams, can be implemented by a machine system to manufacture and implement embodiments as described herein.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed:

1. An apparatus comprising:
   a magnetic tape head module including a plurality of elements configured to perform at least one operation selected from the group consisting of reading data from a magnetic tape and writing data to a magnetic tape;
   the magnetic tape head module further including a module bonding pad region including a first row of module bonding pads and a second row of module bonding pads, the first row of module bonding pads and the second row of module bonding pads configured to accommodate wirebonds thereon;
   wherein the module bonding pad region includes a stepped structure configuration so that the first row of module bonding pads is positioned at a different height than the second row of module bonding pads.

2. The apparatus of claim 1, further comprising a cable including a cable bonding pad region including a first row of cable bonding pads and a second row of cable bonding pads, wherein the magnetic tape head module and the cable are positioned so that the first row of module bonding pads and the first row of the cable bonding pads are positioned between the second row of module bonding pads and the second row of cable bonding pads.

3. The apparatus of claim 2, further comprising a first group of wirebonds coupling a plurality of the module bonding pads in the first row of module bonding pads to a plurality of the cable bonding pads in the first row of cable bonding pads, and a second group of wirebonds coupling a plurality of the module bonding pads in the second row of module bonding pads to a plurality of the cable bonding pads in the second row of cable bonding pads, wherein the second group of wirebonds extend to a greater height than the first group of wirebonds.

4. The apparatus of claim 1, wherein the module bonding pads in the first row of module bonding pads are aligned with the module bonding pads in the second row of module bonding pads.

5. The apparatus of claim 1, wherein the first row of module bonding pads is positioned at a lower height than the second row of module bonding pads.

6. The apparatus of claim 2, wherein the cable bonding pad region includes a stepped structure configuration, so that the first row of cable bonding pads is positioned at a different height than the second row of cable bonding pads, wherein the first row of first row of module bonding pads is positioned at a lower height than the first row of cable bonding pads, and the second row of module bonding pads is positioned at a lower height than the second row of cable bonding pads.

7. The apparatus of claim 2, wherein the first row of module bonding pads is positioned at a higher height than the first row of cable bonding pads, and the second row of module bonding pads are positioned at a higher height than the second row of cable bonding pads.

8. The apparatus of claim 1, wherein the magnetic tape head module includes an air bearing surface over which a magnetic tape travels during the at least one operation, wherein the module bonding pads are spaced a distance away from the air bearing surface.

9. The apparatus of claim 2, wherein at least one of the first row of module bonding pads and the second row of module bonding pads is positioned at a lower height than at least one of the first row of cable bonding pads and the second row of cable bonding pads.

10. An apparatus comprising:
a magnetic tape head module including a plurality of elements configured to perform at least one operation selected from the group consisting of reading data from a magnetic tape and writing data to a magnetic tape, the magnetic tape head module further including a first row of module bonding pads and a second row of module bonding pads;
a cable including a first row of cable bonding pads and a second row of cable bonding pads;
the magnetic tape head module and the cable positioned so that the first row of module bonding pads and the first row of the cable bonding pads are positioned between the second row of module bonding pads and the second row of cable bonding pads;
a first group of wirebonds electrically coupling the first row of module bonding pads and the first row of cable bonding pads; and
a second group of wirebonds electrically coupling the second row of module bonding pads to the second row of cable bonding pads;
wherein the second group of wirebonds is positioned to extend to a greater height than the first group of wirebonds.

11. The apparatus of claim 10, wherein the first row of module bonding pads and the second row of module bonding pads include a stepped structure configuration so that the first row of module bonding pads is at a lower height than the second row of module bonding pads.

12. The apparatus of claim 11, wherein the first row of cable bonding pads and the second row of cable bonding pads include a stepped structure configuration so that the first row of cable bonding pads is at a lower height than the second row of cable bonding pads, the first row of cable bonds is at a lower height than the first row of module bonding pads, and the second row of cable bonding pads is at a lower height than the second row of module bonding pads.

13. The apparatus of claim 10, wherein the first row of module bonding pads and the second row of module bonding pads are at a common height, wherein the first row of cable bonding pads is at a lower height than the first row of module bonding pads, and wherein the first row of cable bonding pads is at a lower height than the second row of cable bonding pads.

14. The apparatus of claim 10, wherein the first row of cable bonding pads is at a higher height than the first row of module bonding pads, and wherein the first row of module bonding pads is at a lower height than the second row of module bonding pads.

15. The apparatus of claim 10, wherein at least one of the first row of cable bonding pads and the second row of cable bonding pads is positioned at a lower height than at least one of the first row of module bonding pads and the second row of module bonding pads.

16. The apparatus of claim 10, wherein at least one of the first row of module bonding pads and the second row of module bonding pads is positioned at a lower height than at least one of the first row of cable bonding pads and the second row of cable bonding pads.

17. A method for forming an apparatus comprising:
providing a tape head module including a plurality of elements configured to perform at least one operation selected from the group consisting of reading data from a magnetic tape and writing data to a magnetic tape;
providing the tape head module to include a module bonding pad region including a first row of module bonding pads and a second row of module bonding pads on the tape head module;
providing a cable including a cable bonding pad region including a first row of cable bonding pads and a second row of cable bonding pads;
positioning the first row of module bonding pads and the first row of the cable bonding pads between the second row of module bonding pads and the second row of cable bonding pads;
providing at least one of the module bonding pad region and the cable bonding pad region with a stepped structure configuration so that the at least one of the module bonding pad region and the cable bonding pad region has the first row at a different height than the second row;
providing a first group of wirebonds coupling a plurality of the bonding pads in the first row of module bonding pads to a plurality of the bonding pads in the first row of cable bonding pads; and
providing a second group of wirebonds coupling a plurality of the bonding pads in the second row of module bonding pads to a plurality of the bonding pads in the second row of cable bonding pads.

18. The method of claim 17, wherein the tape head module includes an air bearing surface over which a magnetic tape travels during the at least one operation, and positioning the first row of module bonding pads and the second row of module bonding pads a distance away from the air bearing surface.

19. The method of claim 17, further comprising providing both the module bonding pad region and the cable bonding pad region to have the stepped structure configuration, so that the first row of module bonding pads has a different height than the second row of module bonding pads, and so that that the first row of cable bonding pads has a different height than the second row of cable bonding pads.

20. The method of claim 17, further comprising and providing the first row of module bonding pads at a lower height than the first second row of module bonding pads.

* * * * *